United States Patent
Bonavita

[15] 3,655,511
[45] Apr. 11, 1972

[54] RECOVERY OF MICRO-ORGANISMS CULTIVATED ON HYDROCARBONS

[72] Inventor: Jean Baptiste Bonavita, Epernon, France

[73] Assignee: The British Petroleum Company Limited, London, England

[22] Filed: May 29, 1968

[21] Appl. No.: 732,824

[30] Foreign Application Priority Data

June 27, 1967 Great Britain......................29,514/67

[52] U.S. Cl. ............................................195/28 R, 195/82
[51] Int. Cl. ......................................................C12b 1/00
[58] Field of Search.........................................195/3 H, 28, 82

[56] References Cited

UNITED STATES PATENTS

| | | | |
|---|---|---|---|
| 3,268,412 | 8/1966 | Champagnot et al......................195/3 |
| 3,268,419 | 8/1966 | Champagnat et al....................195/82 |
| 3,520,777 | 7/1970 | Filosa......................................195/28 |

*Primary Examiner*—Joseph M. Golian
*Attorney*—Morgan, Finnegan, Durham and Pine

[57] ABSTRACT

Process which comprises cultivating a micro-organism which is capable of growing on at least some straight chain hydrocarbons, for example a yeast, such as a Candida tropicalis, cultivation being carried out in the presence of a hydrocarbon feedstock which consists in part of straight chain hydrocarbons in the presence of an aqueous nutrient medium and in the presence of a gas containing free oxygen and thereafter separating from the product, an aqueous phase and a product mixture, the product mixture comprising the micro-organism, unconsumed hydrocarbons and an aqueous phase, thereafter treating the product mixture with an alcohol and a solvent hydrocarbon used in either order or together each part by volume of said product mixture being treated with 0.5 to 2 parts by volume of said alcohol and with 0.5 to 2 parts by volume of said solvent hydrocarbon, the treated product mixture being thereafter subjected to phase separation with recovery of a phase comprising the solvent hydrocarbon and unconsumed hydrocarbons and with recovery of a phase mixture comprising alcohol, water and the micro-organism.

11 Claims, No Drawings

RECOVERY OF MICRO-ORGANISMS CULTIVATED ON HYDROCARBONS

This invention relates to a process for the recovery of cultivated micro-organisms.

This invention also relates to a process for the removal of straight chain hydrocarbons, wholly or in part, from a hydrocarbon mixture and to the purification of a hydrocarbon product fraction.

According to the present invention there is provided a process which comprises cultivating a micro-organism which is capable of growing on at least some straight chain hydrocarbons, cultivation being carried out in the presence of a hydrocarbon feedstock which consists in part of straight chain hydrocarbons in the presence of an aqueous nutrient medium and in the presence of a gas containing free oxygen and thereafter separating, from the product, an aqueous phase and a product mixture, said product mixture comprising the micro-organism, unconsumed hydrocarbons and an aqueous phase, thereafter treating said product mixture with an alcohol and a solvent hydrocarbon, said product mixture being treated first either with said alcohol or said solvent hydrocarbon or said product mixture being treated simultaneously with said alcohol and said solvent hydrocarbon or said product mixture being treated with a solvent mixture of said alcohol and solvent hydrocarbon, each part by volume of said product mixture being treated with 0.5 to 2 parts by volume of said alcohol and with 0.5 to 2 parts by volume of said solvent hydrocarbon, the treated product mixture being thereafter subjected to phase separation with recovery of a phase comprising said solvent hydrocarbon and said unconsumed hydrocarbons and with recovery of a phase mixture comprising said alcohol, water and the micro-organism.

Preferably the phase mixture thus recovered is subjected to phase separation to recover a solid phase product consisting of the micro-organism. Preferably this is achieved by filtering the phase mixture comprising said alcohol, water and micro-organism. Preferably a filter cake so obtained is washed with water or an aqueous medium to remove traces of said alcohol. If desired, other phase separation methods can be employed, for example, centrifuging.

Preferably liquid fractions obtained by the process as hereinbefore described are treated, for example by distillation, singly or after blending of two or more fractions, to recover said solvent hydrocarbon and, separately or in admixture therewith, said alcohol.

Preferably the relative proportions of said alcohol and solvent hydrocarbon which are employed in the treatment of the product mixture lie in the range 1 to 4 parts by volume of solvent hydrocarbon per part by volume of said alcohol.

Preferably the phase mixture comprising said alcohol, water and the micro-organism which is subjected to phase separation contains less than 20 percent by volume of water. It is believed that this limitation on water content has a significant effect on the ease of subsequent separation of the micro-organism from the liquid phase.

Suitably the solvent hydrocarbon is selected from pentanes, hexanes and mixtures of hydrocarbons, for example, petroleum ethers. However, the preferred solvent hydrocarbon is normal hexane.

Suitably the alcohol is selected from ethanol, propanol, isopropanol and the butanols. The preferred alcohol is isopropanol.

Usually the straight chain hydrocarbons employed in the feedstock, for cultivation of micro-organisms, will be paraffins; however, the straight chain hydrocarbons may be present as olefins; also there may be used a mixture containing straight chain paraffins and olefins.

Suitable feedstocks to the process of the invention include kerosine, gas oils and lubricating oils; these feedstocks may be unrefined or may have undergone some refinery treatment, but must contain a proportion of straight chain hydrocarbons in order to fulfil the purpose of this invention. Suitably the petroleum fraction will contain 3–45 percent by weight of straight chain hydrocarbons. Preferably the petroleum fractions have a mean molecular weight corresponding to at least 10 carbon atoms per molecule.

The process of the invention is of particular value for the treatment of petroleum gas oil fractions which contain straight chain hydrocarbons in the form of waxes, since by the process of the invention a gas oil of improved pour point is obtained while the waxes are converted to a valuable product.

Within the term 'micro-organism' used herein we include mixtures of micro-organisms. Preferably the micro-organism is capable of growing on at least some normal paraffins.

Micro-organisms which are cultivated as herein described may be yeasts, moulds or bacteria.

The yeasts in this specification are classified according to the classification system outlined in "The Yeasts, a Taxonomic Study" by J. Lodder and W.J.W. Kreger-Van Rij, published by North Holland Publishing Co. (Amsterdam) (1952).

The bacteria mentioned in this specification are classified according to the classification system outlined in "Bergey's Manual of Determinative Bacteriology" by R.S. Breed, E.G.D. Murray and N.R. Smith, published by Bailliere, Tindall and Cox (London) 7th edition (1957).

Preferably when a yeast is employed this is of the family Cryptococcaceae and particularly of the sub-family Cryptococcoideae however, if desired there may be used, for example, ascosporogeneous yeasts of the sub-family Saccharomycoideae. Preferred genera of the Cryptococcoideae sub-family are Torulopsis (also known as Torula) and Candida. Preferred species of yeast are as follows. In particular it is preferred to use the specific stock of indicated Baarn reference number; these reference numbers refer to CBS stock held by the Centraal Bureau vor Schimmelculture, Baarn, Holland and to INRA stock held by the Institut National de la Recherche Agronomique, Paris, France.

| | Preferred strains |
|---|---|
| *Candida lipolytica* | |
| *Candida pulcherrima* | CBS 610 |
| *Candida utilis* | |
| *Candida utilis*, variety | CBS 841 |
| *Candida tropicalis* | CBS 2317 |
| *Torulopsis colliculosa* | CBS 133 |
| *Hansenula anomala* | CBS 110 |
| *Oidium lactis* | |
| *Neurospora sitophila* | |
| *Mycoderma cancoillote* | INRA: STV 11 |

Of the above Candida lipolytica and C. tropicalis are particularly preferred.

If desired the micro-organism may be a mould. Suitable moulds are Penicillium and preferably there is used Penicillium expansum. Another suitable genus is Aspergillus.

If desired the micro-organism may be a bacterium.
Suitably the bacteria are of one of the orders:
Pseudomonadales, Eubacteriales and Actinomycetales.

Preferably the bacteria which are employed are of the families Corynebacteriaceae, Micrococcaceae, Achromobacteraceae, Actincymyoetaoeae, Rhizobiaceae, Bacillaceae, and Pseudomonadaceae. Preferred species are *Bacillus megaterium*, *Bacillus subtilis* and *Pseudomonas aeruginosa*. Other species which may be employed include:

*Bacillus amylobacter*
*Pseudomonas natriegens*
*Arthrobacter sp.*
*Micrococcus sp.*
*Corynebacterium sp.*
*Pseudomonas syringae*
*Xanthomonas begoniae*
*Flavobacterium devorans*
*Acetobacter sp.*
*Actinomyces sp.*
*Nocardia opaca*

It will usually be possible to separate the micro-organism, contaminated with some unmetabolised feedstock and aqueous nutrient medium, from the bulk of the unmetabolised feedstock fraction. Preferably the separation is achieved by means of a decantation; additionally or alternatively centrifuging may be used. The fraction containing the micro-organism is now subjected to treatment with an alcohol and a solvent hydrocarbon and to phase separation as hereinbefore described.

The hydrocarbons recovered in the extract phase by solvent extraction, if metabolisable, may be recycled to the micro-organism cultivation stage.

Preferred methods for use in the cultivation of the micro-organism and for the recovery of the product are described in British Pat. Specification Nos. 914567, 914568, 1017584, 1017585, 1021697, 1021698, 1049065, 1049066, 1049067 and 1059881 through to 1059890 inclusive.

This invention is illustrated but in no way limited with reference to the following Examples.

EXAMPLE 1

2.6 liters of the following aqueous mineral medium was introduced into a 3 liter stirred fermenter:

|  | grams/liter |
| --- | --- |
| $(NH_4)_2 HPO_4$ | 2 |
| KCl | 1.15 |
| $MgSO_4 \cdot 7H_2O$ | 0.32 |
| $MnSO_4 \cdot 7H_2O$ | 0.022 |
| $ZnSO_4 \cdot 7H_2O$ | 0.085 |
| $FeSO_4 \cdot 7H_2O$ | 0.034 |
| Yeast Extract | 0.015 |

To the fermenter was added as an inoculum, 1.5 grams of the yeast *Candida tropicalis* in 200 mls of the aqueous nutrient medium hereinbefore described. The carbon substrate was a gas oil of the following characteristics:

| specific gravity (at 60° F.) | 0.865 |
| --- | --- |
| cloud point | + 18° C. |
| pour point | + 16° C. |
| sulphur | 0.90% by wt. |
| normal paraffins | 15% by wt. |

Continuous cultivation was carried out with addition of the carbon substrate and aqueous nutrient medium under the following conditions:

| carbon substrate feed rate | 0.1 vol/vol/hour |
| --- | --- |
| dilution rate | 0.2 vol/vol/hour |
| agitation by stirring - rate | 2,500 revs/min |
| aeration | 30 vol/vol/hour |
| pH | 5.5 |
| temperature | 30° C. | pH control was by addition of 5N aqueous ammonia.

The micro-organism product was recovered as follows. The broth obtained from the fermenter was continuously fed to a decanter with removal of a lower aqueous phase and recovery of an upper phase containing the yeast, hydrocarbons and some aqueous material.

The upper phase constituted 25 percent by volume of the broth.

To 100 ml of the upper phase was added with stirring 100 ml of isopropanol followed by 100 ml of normal hexane. Two liquid phases separated, the upper phase having a volume of 145 ml and containing the bulk of the normal hexane, with residual hydrocarbon from the carbon substrate and lipids extracted from the yeast.

The upper phase was separated by decantation. The lower phase containing water, the bulk of the isopropanol and yeast in suspension was filtered on a Tergal lacquered filter at reduced pressure with recovery of a solid micro-organism product substantially free of hydrocarbons and solvent. Four grams of dry micro-organism were obtained.

EXAMPLE 2

The process described in Example 1 was repeated except that the amounts of isopropanol and normal hexane which were employed were respectively 150 ml and 50 ml.

Four grams of dry micro-organism were obtained. In comparison with Example 1, the decantation rate was found to have been assisted by the use of the greater quantity of isopropanol but, as a result of the use of the lower quantity of hexane, the recovered biomass was found to contain trace amounts of hydrocarbon.

What we claim is:

1. A process for the separation of cultivated micro-organisms from a culture broth comprising:
   a. preparing a culture broth from a mixture of an aqueous nutrient medium and a hydrocarbon feedstock which contains straight chain hydrocarbons metabolizable by a micro-organism,
   b. cultivating in said broth a micro-organism capable of growing on at least some of said straight chain hydrocarbons, the cultivating step being carried out in the presence of a gas containing free oxygen in said culture broth,
   c. terminating the cultivating step by separating the cultivated broth into a lower aqueous phase and an upper phase containing the microorganism, unconsumed hydrocarbons and water and isolating the phase each from the other,
   d. thereafter, without further processing, mixing the isolated formerly upper phase with an alcohol and a solvent hydrocarbon in a proportion of one part by volume of said isolated formerly upper phase fraction, with 0.5 to 2 parts by volume of said alcohol and with 0.5 to 2 parts by volume of said solvent hydrocarbon to form a mixture containing less than 20 percent by volume of water.
   e. subjecting the mixture of (d) to phase separation by decantation,
   f. recovering an upper phase mixture comprising said solvent hydrocarbon and said unconsumed hydrocarbons,
   g. recovering a lower phase mixture comprising said alcohol, water and micro-organism, and
   h. subjecting the lower phase mixture from (g) to phase separation and recovering a solid phase product containing the micro-organisms.

2. A process according to claim 1 in which the micro-organism is a normal paraffin-consuming micro-organism.

3. A process according to claim 1 in which the micro-organism is a yeast.

4. A process according to claim 1 in which the micro-organism is of the genus Candida.

5. A process according to claim 1 in which the micro-organism is *Candida lipolytica*.

6. A process according to claim 1 in which the micro-organism is *Candida tropicalis*.

7. A process according to claim 1 in which the hydrocarbon feedstock is a petroleum fraction.

8. A process according to claim 1 in which the hydrocarbon feedstock is a gas oil.

9. A process according to claim 1 in which the solvent hydrocarbon is normal hexane.

10. A process according to claim 1 in which the alcohol is ethanol, propanol, isopropanol or a butanol.

11. A process according to claim 1 in which the relative portions of the alcohol and solvent hydrocarbon lie in the range 1 to 4 parts by volume of solvent hydrocarbon per part by volume of said alcohol.

* * * * *